US000001070H

United States Statutory Invention Registration [19]

[11] Reg. Number: H1070

Harrison et al.

[43] Published: Jul. 7, 1992

[54] GRANULATION OF POTASH MATERIALS

[75] Inventors: Cecil P. Harrison, Florence; Cullen G. Tittle, Tuscumbia, both of Ala.

[73] Assignee: Tennessee Valley Authority, Muscle Shoals, Ala.

[21] Appl. No.: 456,414

[22] Filed: Dec. 26, 1989

[51] Int. Cl.[5] ..... C05B 19/00

[52] U.S. Cl. ..... 23/313 R; 23/313 P; 71/64.03; 71/64.05

[58] Field of Search ..... 23/313 P, 313 R; 71/61, 71/63, 64.05, 64.12, 64.03, 64.11

[56] References Cited

U.S. PATENT DOCUMENTS

| | | | |
|---|---|---|---|
| 2,436,771 | 2/1948 | Hood | 23/313 P |
| 3,620,709 | 11/1971 | Petkovsek et al. | 23/313 |
| 3,711,254 | 1/1973 | McGowan et al. | 23/302 |
| 3,853,490 | 12/1974 | Boeglin et al. | 23/313 |
| 3,984,225 | 10/1976 | Sears et al. | 71/64.11 |
| 4,277,253 | 7/1981 | Walter et al. | 23/313 R |
| 4,743,289 | 5/1988 | Mickus et al. | 71/64.05 |
| 4,846,871 | 7/1989 | Detroit | 71/64.05 |

FOREIGN PATENT DOCUMENTS

| | | | |
|---|---|---|---|
| 55-56087 | 4/1980 | Japan | 71/63 |
| 63-21276 | 1/1988 | Japan | 71/63 |
| 1137095 | 1/1985 | U.S.S.R. | 71/63 |

*Primary Examiner*—Richard D. Lovering
*Assistant Examiner*—Joseph D. Anthony
*Attorney, Agent, or Firm*—Robert A. Petrusek

[57] ABSTRACT

A process for granulating finely divided particulate sulfate or chloride salts of potassium to produce therefrom agricultural products having exceptionally satisfactory physical and chemical properties in regard to bulk blending with other fertilizer blend materials and also in regard to storage and handling properties. The instant methods involve introducing fine-sized, particulate feedstock together with recycle material into a conventional granulator and granulating the solids with use of a water solution comprised of the potassium salt to be granulated and portions of lignosulfonate, which solution has been found to bind the solids material together in a manner and form highly desirable. Drying of the resulting granulation material is required. Nominal grades of the sulfate and chloride granular products are about 47 and 57 percent by weight $K_2O$ equivalent, respectively.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

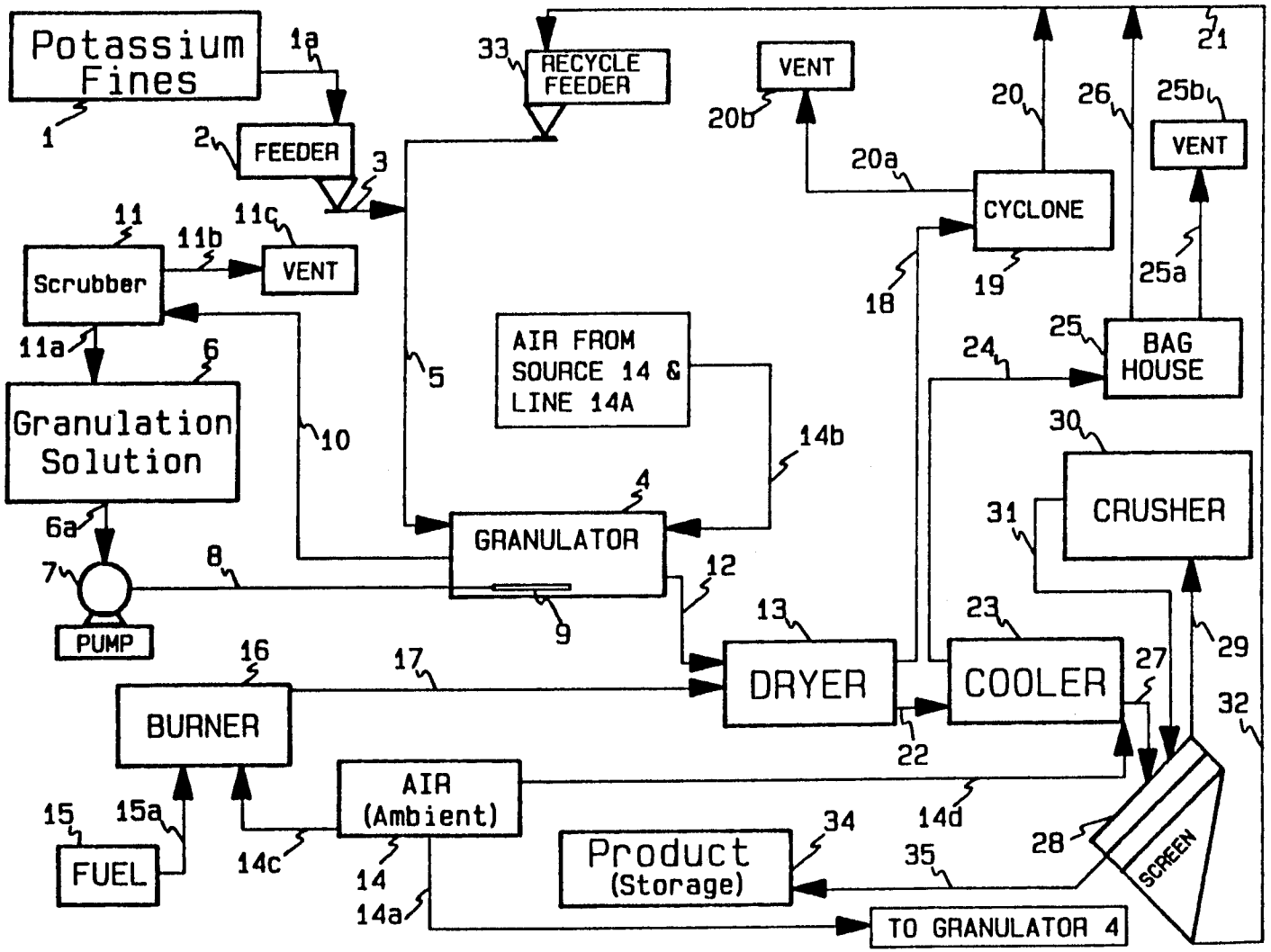
Potassium Fines
1
1a
FEEDER
2
3
RECYCLE FEEDER
33
5
VENT
20b
20a
CYCLONE
19
20
26
21
VENT
25b
25a
BAG HOUSE
25
24
18
AIR FROM SOURCE 14 & LINE 14A
14b
GRANULATOR
4
9
12
DRYER
13
22
COOLER
23
CRUSHER
30
31
29
SCREEN
28
27
32
14d
35
TO GRANULATOR 4
34
Product (Storage)
AIR (Ambient)
14
14a
14c
17
BURNER
16
15a
FUEL
15
8
PUMP
7
6a
Granulation Solution
6
10
VENT
11c
11b
Scrubber
11
11a

GRANULATION OF POTASH MATERIALS

The invention herein described may be manufactured and used by or for the Government for governmental purposes without the payment to us of any royalty therefor.

INTRODUCTION

The present invention relates to a new process for granulating finely divided particulate potassium sulfate or for granulating finely divided particulate potassium chloride, i.e., $K_2SO_4$ or KCl, and to the products resulting therefrom. For the sake of convenience and brevity, said potassium sulfate and said potassium chloride hereinafter oftentimes will be referred to simply as $K_2SO_4$ and KCl; more particularly, the present invention relates to the production of granular $K_2SO_4$ or granular KCl fertilizers that have excellent handling properties, and granule (particle) size and hardness which are very satisfactory either for direct application to soil environments or for blending with other granular fertilizer materials; and still more particularly, the present invention relates to a novel method for granulating fine-size, discrete, particulate $K_2SO_4$ or KCl with the utilization therein of only relatively small proportions of a water solution comprising both the particular potassium salt to be granulated and portions of one or more lignosulfonates.

BACKGROUND OF THE INVENTION

1. Field of the Invention

As is well known, potassium is one of the three chemical elements that is essential to proper nutrition of living plants. The most common form of potassium applied to soil systems is the chloride salt, however, in some crop systems, such as tobacco, the chloride salt is to a degree toxic to the living plants; consequently, the choice potassium salt is the sulfate. In 1987, the estimated consumption of $K_2SO_4$ and KCl salts used by the agricultural industry was about five million short tons and of that quantity, about 40 percent was in granular form and about 60 percent was finely divided particulate material classified as either standard, coarse, or suspension-grade potash materials.

The demand for granular potash fertilizers was fostered with the advent of "bulk blending." In this now large segment of the fertilizer industry, the granules of different composition are blended in proportions calculated to yield a mixture of the desired fertilizer nutrient composition. Bulk blending is extremely popular in the United States and is rapidly gaining worldwide popularity. However, to ensure the homogeneity within a given small volume of such dry-blended fertilizers during mixing, handling, and field application; it has been found essential that all the various ingredients be of closely-matched, particle-size distribution (Hoffmeister, George. "Quality Control in a Bulk-Blending Plant," Proc. TVA Fertilizer Bulk-Blending Conference, Louisville, Ky., Aug. 1-2, 1973). Ignoring this requirement and preparing blends from ingredients of unmatched particle-size distribution inevitably results in segregation of the various components during the mixing or preparation step and subsequently during handling, and distribution such as for example, field application. Thus, when blends are prepared from fertilizer materials of unmatched particle-size distribution, homogeneity is lost with resultant undesirable agronomic effect.

In view of this important requirement that individual ingredients of bulk blends be matched in particle-size distribution, finely divided particulate potash materials classified as standard, coarse, or solution-grade materials cannot satisfactorily be incorporated therein. In order to meet the demand for granular potash materials, the potash industry utilizes the so-called Mannheim process or a modification thereof for production of K2SO4 and a high-cost preheat-compaction-crush and sizing procedure for production of granular KCl.

2. Description of the Prior Art

In production of $K_2SO_4$ by the Mannheim process, potassium chloride (KCl) is reacted with sulfuric acid to produce potassium bisulfate ($KHSO_4$), subsequently the bisulfate together with additional KCl is heated in a Mannheim furnace to convert the bisulfate and the additional KCl to sulfate ($K_2SO_4$). The $K_2SO_4$ clinkers formed in the furnace are then removed, crushed, and sized by screening; the various resulting particle size fractions are marketed as either granular, standard, or suspension-grade products.

In the production of granular KCl, fine-size KCl is first preheated and then fed to a pair of high-pressure rolls that turn toward each other to compress the material into sheets or into briquettes. The resulting compacted material is subsequently crushed and screened, and the undersize material is recycled for additional heating, compaction, and processing. The processes currently used for production of granular $K_2SO_4$ or KCl are not completely satisfactory for meeting all of the fertilizer industries' requirements in that capital costs are high and energy requirements and maintenance costs are excessive. Thusly, a substantial premium can be, and usually is, demanded for granular type potassium fertilizers. In view of these considerations, it should now be obvious to those skilled in the art just how important the present invention is to the large class of bulk-blended fertilizers which need and require granular type feedstock.

SUMMARY OF THE INVENTION

The present invention relates to a new and simple, albeit novel, method for converting finely divided particulate $K_2SO_4$ or KCl to a large granular form which granular form is eminently suitable in particle-size distribution, hardness, and other important characteristics for blending with other granular fertilizer blend materials to produce homogeneous, nonsegregating blends according to the method preferred by blend manufacturers as detailed, supra. The present invention, as will be apparent from a reading of the description, infra, details methods as well as means for effecting same, by which fine-size $K_2SO_4$ or fine-size KCl is processed directly to the desired granular form by agglomeration with relatively small proportions of a carefully formulated water solution of the particular potassium salt being granulated, and lignosulfonate. The instant method can easily be affected in standard granulation equipment such as, for example, a conventional rotary drum granulator, a conventional rotating pan granulator, a conventional falling-curtain granulator, or most any other suitable granulating device. In the operation of the instant method or process, the granulation solution is sprayed onto the particulate potassium salt feedstock-recycled mixture, soon after it enters the granulator and is subsequently processed in a conventional manner.

Products made by the instant process in the manner described herein consist of hard, desirably-sized, free-flowing granules having excellent handling and storage properties. The resulting materials are eminently suitable for bulk blending with other readily-available granular fertilizer materials or for use alone as direct-application fertilizers.

OBJECTS OF THE INVENTION

It is, therefore, a principle object of the present invention to develop energy-efficient, economical processes for granulating finely divided particulate $K_2SO_4$ or KCl to produce hard, nonfriable granular materials of a size eminently suitable for use principally in solid fertilizer bulk-blending operations, but also for direct-application fertilizers.

A further object of the present invention is to provide granulation processes that can easily be carried out with use of existing conventional granulation equipment such as a rotary drum granulator, a conventional rotating pan granulator, a conventional falling-curtain granulator, or any other suitable device and thereby reduce capital and operation cost of present granulation procedures and in turn, reduce the cost of potash products to the agricultural industry.

Another object of the present invention is to identify the particle-size distribution of $K_2SO_4$ and KCl that can successfully be granulated with use of specific conventional granulation equipment such as a conventional rotary drum, or a pan granulator.

Still another object of the present invention is to develop and detail procedures useful for granulating potash salts without use of currently-used, high capital cost, and high operating cost equipment for production of granular potash products.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departure from the true scope and spirit of the instant invention.

DESCRIPTION OF THE DRAWING

The present invention will be better understood from a consideration of the following description taken in connection with the accompanying drawing in which:

The single FIGURE represents a flowsheet for the preferred plant arrangement and generally illustrates the principles of the instant process which result in production of either granular $K_2SO_4$ or granular KCl, chiefly from fine-size $K_2SO_4$ or KCl materials. The procedures utilized for the production of these granular products are the same except that in the granulation of $K_2SO_4$, the granulating solution is a water solution of K2SO4 (including, if desired, by-product scrubber solution) and lignosulfonate, and in granulation of KCl, the granulating solution is a water solution of KCl (also by-product scrubber solution) and lignosulfonate.

Referring now more specifically to the Figure, $K_2SO_4$ or KCl fines from source 1 may be introduced via line 1*a*, hopper-feeder means 2, and line 3 to granulator 4 via line 5. Recycle material from a later-mentioned and described screening operation is also introduced into granulator 4 by means of line 5. Simultaneously therewith granulating solution from source 6 is fed via line 6*a*, pump 7, and line 8 to pipe sparger 9 located in granulator 4. In the operation of granulator 4, the wetting action of the granulating solution causes a substantial portion of the dry solids introduced therein to agglomerate into the desired granular form. The resulting granular material discharging from granulator 4 contains about 2 to 12 percent moisture as determine by the Association of Official Analytical Chemists (AOAC) method and displays a crushing strength of the resulting minus 7- plus 8-mesh Tyler Standard Screen Scale size granules in the range of about 1 to 2 pounds. For the sake of convenience and brevity, said Tyler Standard Screen Scale hereinafter will be referred to simply as screen size or Tyler unless otherwise specified. During operation of the instant process, ambient-temperature air, from source 14, is caused to flow via lines 14*a* and 14*b* countercurrent to the flow of solids through granulator 4 and is exhausted by means of line 10 to wet scrubber 11 and subsequently is exhausted via line 11*b* and vent 11*c* to the atmosphere. The resulting fowled scrubber solution containing $K_2SO_4$ is returned to granulating solution makeup tank 6 via line 11*a*. Subsequently, granular material from granulator 4 flows by means of line 12 to dryer 13. Air from source 14 and fuel from source 15 are combined via lines 14*c* and 15*a*, respectively, in burner-combuster 16 wherefrom it is directed in line 17 cocurrent, in regard to flow of solids, through dryer 13 to effect moisture removal and subsequent hardening of the granules therein. If desired, air from source 14 may be preheated prior to its introduction into burner 14. The drying gases exit dryer 13 and flow by means of line 18 to cyclone fines collector 19 and are subsequently exhausted via line 20*a* and vent 20*b* to the atmosphere. The fines collected at cyclone 19 flow by means of line 20 to line 21, which also connects with line 32 to handle recycle material from a later-mentioned and detailed screening operation. Dried granular materials with moisture contents (AOAC method) ranging from about 0.1 to 0.4 percent flow from dryer 13 by means of line 22 to cooler 23. The resulting granular material exhibits a crushing strength (minus 7- plus 8-mesh test size) in the range of about 4 to 8 pounds. Ambient-temperature air from source 14 is caused to flow via line 14*d* countercurrent to the flow of solids through cooler 23 and exits by means of line 24 to baghouse dust collector 25 wherein the dust is separated from the air. The air is exhausted via line 25*a* and vent 25*b* to the atmosphere. Dust collected in bag house 25 is transported by means of line 26 to recycle material line 21. Granular material from cooler 23 flows by means of line 27 to screen deck 28 whereon the material is sized as desired, preferably minus 6- plus 16-mesh screen size. Oversize material from screen deck 28 flows by means of line 29 to crusher 30 wherein oversized material is partially crushed; the partially crushed material then flow by means of line 31 back to screen deck 28 for rescreening. The granulator fines and fines from the crushing operation flow from screen deck 28 by means of line 32 to join with recycle line 21 which transports recycle material to recycle feeder 33 and thence via line 5 to granulator 4. Onsize product material flows from screen deck 28 to storage 34 via line 35.

DESCRIPTION OF THE PREFERRED EMBODIMENTS

In the practice of the present method for converting fine-size solid $K_2SO_4$ or fine-size KCl to the desired granular form, it has been discovered that an aqueous granulation/agglomerating solution of the appropriate amount and type of potassium salt, together with lignosulfonate (48 or 58% lignosulfonate solution), and in proportions such that said aqueous solution comprises about 12 to 25 percent by weight of the total feedstock (to the process) is very effective for agglomerating the fine-size potassium materials with use of standard conventional granulation equipment.

More particularly, it has now been determined that when the total weight percent proportion of lignosulfonate solute (commercially supplied as either 48 or 58% lignosulfonate solution) in the agglomerating solution is preferably in the range of about 45 to about 55 percent the granules produced by the instant process are mechanically stable.

Still more particularly, it has also been determined that when the potassium salt total weight percent proportion in the agglomerating solution is preferably in the range of from about 3 to about 11 percent, and from about 3 to about 30 percent for $K_2SO_4$ and KCl, respectively, the granules produced by the instant process are mechanically stable and in the usual minus 7- plus 8-mesh size granules test fraction exhibit a crushing strength of 4 to 8 pounds.

Fertilizer granules must have sufficient mechanical stability to withstand normal handling without fracturing and without excessive sloughing to form dust. There are several standardized methods that may be used for measuring the mechanical stability of granular fertilizer materials; however, in the fertilizer industry the simplest and most widely used method is the granule crushing strength test. In the utilization of this method, it is necessary to crush at least 10, and preferably more, granules to obtain an average evaluation. Also, only granules of equal size should be compared because crushing strength of granules increases significantly with increase in particle size, and in view of this fact, the crushing strength, in pounds, of the minus 7- plus 8-mesh Tyler screen-size granules of a fertilizer material has long been recognized as a standard for evaluating mechanical stability of a fertilizer product. A fertilizer material with granule (minus 7-plus 8-mesh Tyler) crushing strength of less than 3 pounds is not usually accepted by the industry.

It has now been determined that when the instant, new agglomerating solution contains less than about 30 percent by weight of the additive/dispersant material, the resulting product granules have a crushing strength outside the acceptable range, i.e., less than about 3 pounds (minus 7- plus 8-mesh size). In the instance of ammonium lignosulfonate as the dispersant material, i.e., 48 percent strength commercial solution, an agglomerating solution containing 30 to 60 percent thereof has, on a total weight basis, from about 14 percent to about 29 percent lignosulfonate. In the instance of calcium lignosulfonates as the dispersant material, i.e., 58 percent strength commercial solution, an agglomerating solution containing 30 to 60 percent thereof has, on a total weight basis, about 17 to about 35 percent lignosulfonate. Accordingly, the agglomerating solution of the instant invention shall contain from as little as about 14 percent to as much as about 35 percent lignosulfonate. In addition, said agglomerating solution must also contain a minimum amount of the dissolved potassium salt in order to ensure that the granules resulting from the agglomeration therewith have desired handling and storage characteristics, including suitable crushing strengths; more particularly, it has now been determined that the agglomerating solution must contain at least about 3 percent by weight of such dissolved potassium salt. Accordingly, it will be appreciated by those knowledgeable of the water solubility characteristics of either $K_2SO_4$ or KCl that, particularly, in the case of $K_2SO_4$ said minimum amount of about 3 percent dictates a rather narrow range of dissolved $K_2SO_4$ in said agglomerating solution. For instance, the solubility of $K_2SO_4$ in cold water, i.e., 0° C. is reported to be 7.4 percent versus 24.1 percent, in hot water, i.e., about boiling temperature. Accordingly, assuming an agglomeration solution feed of about normal ambient temperature, the effective maximum $K_2SO_4$ content thereof is approximately 11 percent and the effective maximum KCl content is approximately 33 percent.

Thusly, the agglomerating solution must contain at least about 30 percent by weight of said commercial lignosulfonate solution (about 48% for ammonium lignosulfonate and about 58% for calcium lignosulfonate) and from about 3 percent to about 11 percent dissolved $K_2SO_4$ or from about 3 percent to about 33 percent KCl. As used herein, it is to be understood that proportions of material expressed in percent are by weight percent, unless otherwise stated.

It is particularly noteworthy that the particle size fraction of the various feed materials is critical and different, depending on both type of material and type of granulation equipment used. For instance, in the granulation of $K_2SO_4$ within a pan-type granulator, the solids feedstock should be of a particle-size distribution similar to that of solution-grade $K_2SO_4$; that is, no more than 20 to 35 percent should be retained on the 100-mesh Tyler Standard Screen, 30 to 50 percent should be in the size range of minus 100- plus 325-mesh, and 20 to 55 percent should be less than 325-mesh size. If granulation of the $K_2SO_4$ is to be carried out with use of a rotary drum-type granulator, the solids feedstock should be of a larger Tyler Standard Screen size distribution than that when using a pan-type granulator; that is, the plus 100-mesh material should comprise 50 to 70 percent of the feed, 10 to 40 percent should be in the size range of minus 100- plus 325-mesh, and 10 to 30 percent by weight should be in the minus 325-mesh size range.

In the granulation of KCl with use of a pan-type granulator or with use of a rotary drum-type granulator, the solids feedstock should be of a Tyler Standard Screen size such that no more than 25 to 45 percent by weight is retained on the 100-mesh screen, 40 to 70 percent is in the size range of minus 100- plus 325-mesh size, and 3 to 15 percent is of minus 325-mesh size. As already noted, supra, for the purpose of describing the instant invention and the acceptable practice thereof, particle size of solids material will hereinafter pertain to Tyler Standard Screen size unless otherwise stated.

The preferred procedure for introducing the solid material to the instant process is to feed same together with any of the recycle material comprising the undersize and crushed oversize fractions removed during the screening operation.

The preferred liquid binder used in the practice of the present invention is a solution of water plus the appropriate potassium salt and lignosulfonate. In plant-scale operation, the granulating solution could consist of the granulator-stack scrubber liquor and lignosulfonate. The lignosulfonate may be any of the cation variety, but the most preferred lignosulfonate at present is ammonium lignosulfonate due principally to economic considerations. The ammonium lignosulfonate used in development of the instant process was usually obtained from the commercial supplier as a 48 weight percent solution. In the instance wherein the lignosulfonate is calcium lignosulfonate instead of ammonium lignosulfonate, it is normally obtained from commercial suppliers in the form of a 58 weight percent solution. Accordingly, after the subsequent dilution with about equal parts of water (granulator scrubber liquor), such resulting agglomerating solutions will assay either about 24 or about 29 percent lignosulfonate.

The most preferred proportion of such agglomerating solution utilized in combination with solids introduced into the granulation equipment, including the virgin feedstock and the recycle material should be about 20 percent by weight when granulating with use of a pan-type granulator and about 6 to 8 percent by weight when granulating with use of a rotary drum-type granulator; however, the proportion of agglomerating solution to final product is of the order of 20 to 45 percent, but preferably on the order of 21 to 37 percent for both pan and drum granulation of either sulfate or chloride potassium salt.

The preferred method for introducing the agglomerating solution to the process is to spray or sparge the solution onto the surface of the cascading or tumbling, free-flowing granulation bed; however, sparging the solution down into the granulation bed should also be satisfactory for introducing the solution phase to the granulator when using a rotary drum-type granulator device.

In operation of bench-scale equipment, it has now been found that in continuous granulation of fine-size $K_2SO_4$ or KCl, the moisture content of the resulting granulator products is in the range of from about 2 to 12 percent by weight. Accordingly, drying of such resulting products was accomplished simply by passing the granulated materials through a conventional, rotary-type dryer equipped with lifting flights.

Screening of products discharged from the dryer may be practiced in any convenient manner including the usual method employing stacked, vibrating screens. A typical screen stack that might be employed during the production of granules and the subsequent sizing of same to match the size (minus 6- plus 16-mesh Tyler Standard Screen Scale) of recommended particle-size distribution of conventionally-marked granular fertilizers consists of a 5-mesh screen stacked atop a 10-mesh screen (Tyler Standard Screen Scale). The onsize fraction utilized in the fertilizer industry is normally minus 6- plus 16-mesh Tyler Standard Screen Scale. Under laboratory conditions, this fraction could be determined or derived using a 6-mesh screen on top and a 16-mesh screen on the bottom which, by definition, would be a minus 6- plus 16-mesh product. However, because of operating conditions encountered in continuous bench-, pilot-, or commercial-scale operations, such as residence time and buildup of material on screens, a 6-mesh screen on top and a 16-mesh screen on the bottom does not lend itself to continuous operation. It has long been known in the industry that a minus 6- plus 16-mesh product could not be obtained using minus 6- plus 16-mesh screens under normal, continuous operation. Therefore, by imperial determination what usually is used are 5- and 10-mesh screens, rather than 6- and 16-mesh screens. The produce resulting from this type of plant operating scheme yields a product of Tyler Standard Screen Scale size distribution so that this approximate percentage, by weight of material retained on individual screens is as follows: 2 percent on the 6-mesh, 14 percent on the 7-mesh, 36 percent on the 8-mesh, 69 percent on the 9-mesh, 85 percent on the 10-mesh, 94 percent on the 12-mesh, 98 percent on the 14-mesh, and 100 percent on the 16-mesh screen. Oversize material, meaning that not passing the 6-mesh screen (plus 5-mesh), may be pulverized and recycled to the granulator along with other fines. Undersize, meaning that passing the 16-mesh screen, may be recycled either with or without further grinding, pulverization, or comminution thereof.

EXAMPLES

In order that those skilled in the art may better understand how the present invention can be practiced, the following examples are given by way of illustration and not necessarily by way of limitation.

EXAMPLE I

Pan Granulator

A very satisfactory granular $K_2SO_4$ product containing 48.7 weight percent K2O equivalent (all percents are given in this and the following examples by weight percent unless otherwise indicated) and 0.04 percent moisture was pan-granulated continuously in bench-scale operation of 4 hours runtime at a production rate of 27 pounds/hour (12.3 kg) from a feed comprising 100 percent solution-grade $K_2SO_4$ and 20 percent by weight of agglomerating solution. The particle-size (Tyler) distribution of the solution-grade $K_2SO_4$ was 28.0 percent plus 100-mesh, 40.6 percent minus 100- plus 325-mesh, and 31.4 percent minus 325-mesh size. The agglomerating solution contained 45.5 percent water, 9 percent dissolved $K_2SO_4$, and 45.5 percent of commercial (48%) ammonium lignosulfonate solution. The granulator was a 14-inch diameter by 2-inch deep pan that rotated counterclockwise, when viewed from a position generally perpendicular from the axis thereof and looking in a direction generally downwardly onto said pan, at a speed of about 34 revolutions/minute. The solid $K_2SO_4$ feedstock was fed to that recycle conveyor which discharged into the granulator at a point near the 10 o'clock position, and the agglomerating solution was sprayed onto the cascading solids in the granulator at a point near the 8 o'clock position, both positions from the perspective as noted, supra. The granulator was operated on a slope that was about 50 degrees above the horizontal. Residence time in the granulator was about 2 minutes.

The particle screen-size (Tyler) distribution of material discharging from the granulator was about 68.8 percent minus 6- plus 16-mesh size, about 11.4 percent plus 6-mesh size, and about 19.8 percent minus 16-mesh size. Moisture content of the granulator product was about 8.6 percent, and granule crushing strength of the minus 7- plus 8-mesh-size granules (all granule crushing strength measurements given in this and in the following examples refer to the minus 7- plus 8-mesh Tyler screen-size test-size granules unless otherwise indicated) was 1 to 2 pounds.

The rotary drum dryer measured 12 inches in diameter by 36 inches long. The unit was equipped with 8 evenly-spaced, 2-inch-high lifting flights. Retainer rings at the feed and discharge ends were 2¾ and 2½ inches high, respectively. The drum was rotated at 10 revolutions/minute. The dryer was equipped so that airflow, at a rate equivalent to about 1,000 cubic feet/ton of product, through the unit was cocurrent in regard to movement of solids. Propane was used as the heat source for drying. The solids were discharged from the dryer at a temperature of about 250° F. and contained 0.04 percent moisture; granule (-7+8 mesh Tyler) crushing strength was about 6 pounds. Particle screen-size (Tyler) distribution of the dryer discharge was 48.6 percent minus 6- plus 16-mesh size, 43.6 percent plus 6-mesh, and 7.8 percent minus 16-mesh size. The moisture content of the dryer product, after cooling to room temperature (about 72° F.), was of the order of 0.04 percent, and granule (-7+8 mesh Tyler) crushing strength was about 6 pounds.

In typical bench-scale size operations, throughput is low and heat loss is excessive, consequently, a cooler is not normally used and the dryer discharge flows directly to the particle-sizing unit.

The dryer product was sized by screening on a vibrating screen deck that was fitted with 5- and 10-mesh (Tyler) screen on the top and bottom, respectively. Analysis showed that 98.7 percent of the screened product was in the particle screen-size range of minus 6- plus 16-mesh, 0.8 percent was plus 6-mesh, and 0.4 percent was minus 16-mesh size. The oversize (plus 5-mesh size) was crushed and returned together with the minus 16-mesh material as recycle to the granulator.

Chemical analysis of the granular product showed $K_2O$ equivalent at 48.7 percent, and moisture at 0.04 percent.

In carrying out the aforementioned test, there were no unusual problems encountered in the processing, handling, or transport of materials.

Typical operating data for this test are presented in Table I, below. In order to ensure ease of reading and comparison, the individual test numbers or designations are coded to relate to the examples from which they were derived. Thusly, in Table I, and also in Table II, infra, the column headings are identified by such examples. Accordingly, the data from this Example I are depicted in Table I, below, under the heading Example I, etc.

TABLE I

Typical Bench-Scale Operating Data During Granulation of Potassium Sulfate

| EXAMPLE NO. | I* | II | III | IV* |
|---|---|---|---|---|
| GRANULATION DEVICE | Pan | Pan | Drum | Drum |
| OPERATING TIME, h | 4 | 4 | 4 | 4 |
| PRODUCTION RATE, kg/h (27 lb/h) | 12.3 | 12.3 | 12.3 | 12.3 |
| PARTICLE-SIZE DISTRIBUTION OF $K_2SO_4$ FEEDSTOCK (Tyler Standard Screen Scale) | | | | |
| +100 | 28.0 | 60.9 | 28.0 | 60.9 |
| −100 +325 | 40.6 | 21.8 | 40.6 | 21.8 |
| −325 | 31.4 | 17.3 | 31.4 | 17.3 |
| GRANULATOR CONDITIONS | | | | |
| Rotation, r/min | 34 | 34 | 41 | 25 |
| Feed rates, g/min $K_2SO_4$ | 200 | 200 | 200 | 200 |
| Feed rates, g/min lignosulfonate solution | 54[a] | 47[a] | 70[b] | 60[b] |
| Lignosulfonate solute and added water | 13.0 | 11.3 | 20.3 | 17.4 |
| Recycle temperature, °F. | — | — | 130 | 160 |
| Recycle ratio, lb/lb product | 1.8:1 | 2.5:1 | 12.8:1 | 25:1 |
| Product temperature, °F. | | | | |
| Moisture content, wt %[c] | 8.6 | 5.0 | 3.9 | 2.0 |
| Particle-size distribution, Tyler | | | | |
| −6 +16 | 68.8 | 60.4 | 40.0 | 79.0 |
| +6 | 11.4 | 12.2 | 42.6 | 17.2 |
| −16 | 19.8 | 27.4 | 17.4 | 3.8 |
| Granule (−7 +8 Tyler) crushing strength, lb | 2 | 2 | 2 | 2 |
| DRYER CONDITIONS | | | | |
| Drum rotation, r/min | 10 | 10 | 10 | 10 |
| Airflow (1 atm and 70° F., $ft^3$/min | 3 | 3 | 3 | 3 |
| Product temperature, °F. | 250 | 250 | 250 | 250 |
| Moisture content, wt % | 0.04 | 0.19 | 0.29 | 0.40 |
| Particle-size distribution, Tyler | | | | |
| −6 +16 | 48.6 | 71.1 | 56.3 | 76.5 |
| +6 | 43.6 | 15.7 | 28.3 | 18.9 |
| −16 | 7.8 | 13.2 | 15.4 | 4.6 |
| Granule (−7 +8 Tyler) crushing strength, lb | 6 | 6 | 6 | 7 |
| ONSIZE PRODUCT (Screen analysis, Tyler) | | | | |
| +5 | 0.8 | 1.8 | 2.8 | 1.0 |
| −5 +6 | 45.2 | 15.1 | 36.0 | 15.9 |
| −6 +8 | 43.8 | 39.9 | 43.6 | 55.7 |
| −8 +10 | 9.0 | 39.8 | 14.1 | 24.0 |
| −10 +12 | 0.6 | 2.0 | 1.2 | 1.6 |
| −12 +16 | 0.2 | 0.9 | 0.9 | 0.9 |
| −16 | 0.4 | 0.5 | 1.4 | 0.9 |
| Granule (−7 +8 Tyler) crushing strength, lb | 6 | 6 | 6 | 7 |
| Chemical analysis, wt % $K_2O$ equivalent | 48.7 | 48.5 | 47.7 | 46.3 |
| Chemical analysis, wt % moisture[c] | 0.04 | 0.19 | 0.29 | 0.40 |

*Indicates preferred results obtained in these tests.

[a]Fifty percent by weight of ammonium lignosulfonate (supplied as 48% solution) and 50% by weight of water.

[b]Fifty percent by weight of calcium lignosulfonate (supplied as 58% solution) and 50% by weight of water.

[c]AOAC vacuum desiccator method.

EXAMPLE II

Negative Test

Pan Granulator

In an unsatisfactory pan-granulation test, the $K_2SO_4$ feedstock was a mixture of fine, particle-size, solution-grade $K_2SO_4$ as used in Example I, supra, and $K_2SO_4$ material of a coarser grind. The particle-size (Tyler) distribution of this feedstock was 60.9 percent plus 100-mesh, 21.8 percent minus 100- plus 325-mesh, and 17.3 percent minus 325-mesh size. The agglomerating solution, water containing 9 percent of dissolved $K_2SO_4$ and 45.5 percent of commercial (48%) of ammonium lignosulfonate solution, equipment, and operating procedure were the same as that used for Example I, supra. Continuous bench-scale operating time of this test was 4 hours and the production rate was 27 pounds/hour.

The Tyler particle-size distribution of material discharging from the granulator was about 60.4 percent minus 6- plus 16-mesh size, about 12.2 percent plus 6-mesh size, and about 27.4 percent minus 16-mesh size. Moisture content of the granulator product was about 5.0 percent, and granule crushing strength of the minus 7- plus 8-mesh screen-size granules was 1 to 2 pounds.

The granulator product was transported by bucket conveyor to the dryer described in Example I, supra. After passing through the dryer, the product discharged at a temperature of about 250° F. Particle-size (Tyler) distribution of the dryer product was 71.1 percent minus 6- plus 16-mesh, 15.7 percent plus 6-mesh, and 13.2 percent minus 16-mesh size. Moisture content after cooling was about 0.19 percent, and granules (-7+8 screen size) crushing strength was about 5.5 pounds.

After sizing, the oversize was crushed and the crushed material, together with fines, was returned to the granulator as recycle material.

Chemical analyses of the granular product showed that $K_2O$ equivalent was 48.5 percent and moisture was 0.19 percent.

In carrying out this test, granulation deteriorated with time of test run. As the test continued, fines from the screening and crushing operation, meaning the minus 16-mesh material, would not agglomerate and consequently, all recycle could not be returned to the granulator.

Typical operating data are presented as Example II in Table I, supra.

EXAMPLE III

Negative Test

Drum Granulator

This example is presented to illustrate the significance of the particular type of granulating device for granulating fine, particle-size, solution-grade $K_2SO_4$. The solution-grade $K_2SO_4$ feedstock used in this test was the same as that used in Example I, supra; that is, the Tyler particle screen-size distribution of the solid feedstock was 28.0 percent plus 100-mesh, 40.6 percent minus 100- plus 325-mesh, and 31.4 percent minus 325-mesh size.

The granulation device was a rotary drum granulator which was 12 inches in diameter by 12 inches long and was equipped with 2½-inch high and 2-inch high retainer rings at the feed and discharge ends, respectively. The drum was operated on a slope of about 1 inch/foot and rotated at speeds equivalent to 50 to 60 percent of its critical speed. The drying and screening means were the same as used in Example I, supra. The duration of the test was 4 hours, and the production rate was 27 pounds/hour.

In startup operation, the system (recycle feeder drum granulator, and dryer) was loaded with recycle material from a previous test (Example I, supra), which had a Tyler particle-size distribution of about 78.6 percent of minus 6- plus 16-mesh and about 21.4 percent of minus 16-mesh material. The recycle material was circulated in the system and when temperatures were about normal operating range, introduction of the $K_2SO_4$ solution-grade feedstock and the 45.5 percent of commercial (58%) water, 9 percent dissolved $K_2SO_4$, and 45.5 percent calcium lignosulfonate agglomerating solution was started.

Granulation in the test was judged unsatisfactory in that the solution-grade $K_2SO_4$ feedstock overgranulated when the proportion of liquid phase was adequate to cause granulation. The particle-size (Tyler) distribution of the drum granulator product was 40 percent minus 6- plus 16-mesh size, 42.6 percent plus 6-mesh, and 17.4 percent minus 16-mesh size. Moisture content of the granulator product was about 3.9 percent, and crushing strength of the minus 7- plus 8-mesh screen-size granules was about 2 pounds. The drum granulator product was conveyed to the drying means as in Example I, supra, for removal of moisture.

The material discharged from the dryer at a temperature of 250° F., moisture content was about 0.29 percent, and particle-size distribution was 56.3 percent in the range of minus 6- plus 16-mesh screen size, 28.3 percent was plus 6-mesh screen size, and 15.4 percent was minus 16-mesh screen size. After sizing the dryer product, granule crushing strength of the minus 7- plus 8-mesh screen fraction was 6 pounds.

Chemical analysis of the granular product indicated that the $K_2O$ equivalent was 47.7 percent and the moisture content was 0.29 percent.

The chief problem encountered in this test was overgranulation when the agglomerating solution feed was adequate to cause granulation. The oversize particles did not readily discharge from the granulator, but tended to remain therein and continued to increase in size.

Typical operating data for this test are presented as Example III in Table I, supra.

EXAMPLE IV

Drum Granulator

A very satisfactory granular $K_2SO_4$ product was made in continuous drum-granulation bench-scale operation of 4 hours runtime at a production rate of 27 pounds/hour from a feed of particle-size distribution essentially the same as feed used in Example II, supra. The particle size of feedstock for this example was somewhat larger than that of the solution-grade $K_2SO_4$ used in Examples I and III, supra. The Tyler screen-size distribution of feedstock for this test was 60.9 percent plus 100-mesh, 21.8 percent minus 100- plus 325-mesh, and 17.3 percent minus 325-mesh size; the agglomerating solution was water containing 9 percent dissolved $K_2SO_4$ and 45.5 percent of 58 percent calcium lignosulfonate solution; the granulation device was the same rotary drum as used in Example III, supra.

In the startup operation of this test, the plant system was loaded with recycle material from a previous test and circulated until temperatures reached normal operating condition after which introduction of feed, solids, and solution were started. The duration of the test was 4 hours.

During the test, the drum-granulator operation was satisfactory in that all recycle material was returned to the unit. Particle screen-size (Tyler) distribution of the granulator product was 79.0 percent minus 6- plus 16-mesh size, 17.2 percent was plug 6-mesh size, and 3.8 percent was minus 16-mesh size. Moisture content of the granulator product was 2.0 percent, and granule crushing strength of the minus 7- plus 8-mesh (Tyler) granules was about 2 pounds.

The granulator product was transported by bucket conveyor to the dryer as described in Example I, supra. After passing through the dryer, the product discharged at a temperature of 250° F. Particle screen-size (Tyler) distribution of the dryer product was 76.5 percent minus 6- plug 16-mesh size, 18.9 percent was plus 6-mesh, and 4.6 percent was minus 16-mesh size. After sizing and cooling, moisture content was about 0.40 percent, and granule crushing strength of the minus 7- plus 8-mesh screen-size granules was about 7 pounds. The oversized material as crushed and returned together with fines to the granulator as recycle material.

Chemical analysis of the granular product showed that $K_2O$ equivalent was 46.3 percent and moisture was 0.40 percent.

In carrying out this test, granulation and overall operation was judged to he satisfactory in that all recycle material was returned to the granulator during the test run.

Typical operating data for this test are presented as Example IV in Table I, supra.

EXAMPLE V

Pan Granulator

A very satisfactory granular KCl product containing 58.4 percent $K_2O$ equivalent and 0.2 percent moisture was granulated continuously in bench-scale pan-granulator operation for 2 hours runtime at a production rate of 27 pounds/hour from a feed comprising KCl identified as Dumas dust that had been further pulverized so that its Tyler particle screen-size distribution was 37.5 percent plus 100-mesh, 59.7 percent minus 100- plus 325-mesh, and 2.8 percent minus 325-mesh size. The agglomerating solution was a mixture of 56.5 percent by weight of water-saturated KCl solution and 43.5 percent by weight of a 48 percent solution of ammonium lignosulfonate; the proportion of agglomerating solution used was equivalent to about 450 pounds/ton of product. The pan granulator was 16 inches in diameter and 3 inches deep and was rotated, when viewed from above, counterclockwise at a speed of abut 30 revolutions/minute. The other operational equipment and procedures were the same as described in Example I, supra.

The Tyler particle screen-size distribution of material discharging from the granulator was about 65.7 percent minus 6- plus 16-mesh size, about 15.8 percent plus 6-mesh size, and about 18.5 percent minus 16-mesh size. Moisture content of the product was about 8.1, and crushing strength of the minus 7- plus 8-mesh screen-size granules was about 2 pounds.

The granulator product was conveyed by means of a bucket conveyor to the dryer. The dryer product discharged at a temperature of 250° F., and Tyler particle screen-size distribution was 67.2 percent minus 6- plus 16-mesh, 16.9 percent plus 6-mesh, and 15.9 percent minus 16-mesh size. Moisture content of the dryer product was about 0.2 percent, and granules crushing strength of the minus 7- plus 8-mesh size granules was about 6 pounds. After sizing the dryer product, the oversize was crushed and the crushed material, together with fines, was returned to the granulator as recycle material.

Chemical analyses showed that the granulator KCl product contained 58.4 percent $K_2O$ equivalent and 0.2 percent moisture.

In carrying out this test, there were no unusual problems encountered in the processing, handling, or transport of material. Typical operating data for this test are presented as Example V in Table II, below.

TABLE II

Typical Bench-Scale Operating Data During Granulation of Potassium Chloride

| EXAMPLE NO. | I* | II | III | IV* |
|---|---|---|---|---|
| GRANULATION DEVICE | Pan | Pan | Drum | Drum |
| OPERATING TIME, h | 2 | 2 | 2 | 2 |
| PRODUCTION RATE, kg/h (27 lb/h) | 12.3 | 12.3 | 12.3 | 12.3 |
| PARTICLE-SIZE DISTRIBUTION OF $K_2SO_4$ FEEDSTOCK (Tyler Standard Screen Scale) | | | | |
| +100 | 37.5 | 55.0 | 37.5 | 55.0 |
| −100 +325 | 59.7 | 39.3 | 59.7 | 39.3 |
| −325 | 2.8 | 5.7 | 2.8 | 5.7 |
| GRANULATOR CONDITIONS | | | | |
| Rotation, r/min | 30 | 30 | 30 | 30 |
| Feed rates, g/min $K_2SO_4$ | 200 | 200 | 200 | 200 |
| Feed rates, g/min lignosulfonate solution | 45[a] | 60[a] | 65[a] | 65[a] |
| Lignosulfonate solute and added water | 9.5 | 12.5 | 13.5 | 13.5 |
| Recycle temperature, °F. | — | — | 110 | 105 |
| Recycle ratio, lb/lb product | 1.9:1 | 4:1 | 7.7:1 | 8.3:1 |
| Product temperature, °F. | | | | |
| Moisture content, wt %[b] | 8.1 | 7.8 | 4.4 | 4.5 |
| Particle-size distribution, Tyler | | | | |
| −6 +16 | 65.7 | 84.1 | 71.0 | 58.6 |
| +6 | 15.8 | 4.8 | 15.8 | 6.3 |
| −16 | 18.5 | 11.1 | 13.2 | 35.1 |
| Granule (−7 +8 Tyler) crushing strength, lb | 2 | 2 | 2 | 2 |
| DRYER CONDITIONS | | | | |
| Drum rotation, r/min | 10 | 10 | 10 | 10 |
| Airflow (1 atm and 70° F., $ft^3$/min | 3 | 3 | 3 | 3 |
| Product temperature, °F. | 250 | 250 | 250 | 250 |
| Moisture content, wt % | 0.2 | 0.2 | 0.2 | 0.2 |

TABLE II-continued

Typical Bench-Scale Operating Data During Granulation of Potassium Chloride

| EXAMPLE NO. | I* | II | III | IV* |
|---|---|---|---|---|
| Particle-size distribution, Tyler | | | | |
| −6 +16 | 67.2 | 80.7 | 71.1 | 66.4 |
| +6 | 16.9 | 2.9 | 20.0 | 10.1 |
| −16 | 15.9 | 16.4 | 8.9 | 23.5 |
| Granule (−7 +8 Tyler) crushing strength, lb | 6 | 6 | 7 | 7 |
| ONSIZE PRODUCT (Screen analysis, Tyler) | | | | |
| +5 | 0.6 | 0.1 | 1.2 | 0.4 |
| −5 +6 | 11.1 | 2.2 | 13.7 | 11.1 |
| −6 +8 | 57.4 | 27.5 | 49.1 | 45.8 |
| −8 +10 | 28.9 | 65.1 | 34.2 | 38.7 |
| −10 +12 | 1.1 | 2.9 | 1.1 | 2.3 |
| −12 +16 | 0.4 | 1.4 | 0.2 | 0.8 |
| −16 | 0.5 | 0.8 | 0.2 | 0.9 |
| Granule (−7 +8 Tyler) crushing strength, lb | 6 | 6 | 7 | 7 |
| Chemical analysis, wt % $K_2O$ equivalent | 58.4 | 57.2 | 57.1 | 56.6 |
| Chemical analysis, wt % moisture[b] | 0.2 | 0.2 | 0.2 | 0.2 |

*Indicates preferred results obtained in these tests.
[a]Fifty percent by weight of ammonium lignosulfonate (48% solution) and 50% by weight of water.
[b]AOAC vacuum desiccator method.

EXAMPLE VI

Negative Test

Pan Granulator

In this less than completely satisfactory pan-granulation test, the KCl feedstock was a mixture of KCl material identified as Dumas dust (Example V, supra) and Dumas dust that had been milled to further reduce particle size. The Tyler particle screen-size distribution of the feedstock mixture was 55.0 percent plus 100-mesh, 39.3 percent minus 100- plus 325-mesh, and 5.7 percent minus 325-mesh size, which was somewhat larger particle size than that used for Example V, supra. The pan granulator and other processing equipment, procedures, and agglomerating solution (56.5 percent KCl-saturated water and 43.5 percent of 48 percent solution of ammonium lignosulfonate, 21 percent lignosulfonate) were the same as that used for Example V, supra. The proportion of agglomerating solution used for agglomeration was equivalent to about 600 pounds/ton of granular product. Runtime for this test was 2 hours, and production rate was 27 pounds/hour.

The Tyler particle screen-size distribution of the granulator discharge was 84.1 percent minus 6- plus 16-mesh size, about 4.8 percent plus 6-mesh size, and about 11.1 percent minus 16-mesh size. Moisture content of the product was about 7.8 percent, and crushing strength of the minus 7- plus 8-mesh screen-size granules was about 2 pounds.

The granulator product was conveyed to the dryer, and after passing through the dryer, product temperature was about 250° F., moisture content was 0.2 percent, and crushing strength of the minus 7- plus 8-mesh size granules was 6 pounds. The Tyler particle screen-size distribution of the dryer discharge was 80.7 percent minus 6- plus 16-mesh size, 2.9 percent plus 6-mesh size, and 16.4 percent minus 16-mesh size.

Chemical analyses of sized product showed that the $K_2O$ equivalent was 57.2 percent and that the moisture content was 0.2 percent.

In carrying out the aforementioned test, granulation was judged not to be satisfactory in that the large (non-powder material) particles in the KCl feedstock did not agglomerate as readily as the powder-type material; consequently, all of the minus 16-mesh material being generated could not be returned as recycle.

Typical operating data for this test are presented as Example VI in Table II, supra.

EXAMPLE VII

Drum Granulator

A very satisfactory KCl product containing 57.1 percent $K_2O$ equivalent was granulated continuously with use of a rotary drum in bench-scale operation of 2 hours runtime at a production rate of 27 pounds/hour from a feed of KCl material having a Tyler particle screen-size distribution of 37.5 percent plus 100-mesh, 59.7 percent minus 100- plus 325-mesh, and 2.8 percent minus 325-mesh size. The particle screen-size distribution for feedstock in this test was essentially the same as that used for Example V, supra. The agglomerating solution comprised 56.5 percent by weight water saturated with KCl, and 43.5 percent by weight of 48 percent solution of ammonium lignosulfonate, the same as used for Example V, supra. The agglomerating solution was sprayed onto the active granulation bed in proportion for about 650 pounds/ton or product.

Granulation of the feedstock and recycle material, from the screening operation, was judged to be very satisfactory in that all recycle material was returned to the granulator and because the Tyler particle distribution of the granulator product was 71.0 percent of minus 6- plus 16-mesh screen-size material, 15.8 percent plus 16-mesh size, and 13.2 percent of minus 16-mesh material. Moisture content of the granulator product was 4.4 percent, and granule crushing strength of the minus 7- plus 8-mesh screen-size granules was 2 pounds.

The granulator product was transported by bucket convoy to the dryer and after passing through the unit, the product discharged at a temperature of 250° F. The Tyler particle screen-size distribution of granular material after drying was 71.1 percent minus 6- plus 16-mesh size, 20.0 percent plus 6-mesh size, and 8.9 percent minus 16-mesh size. After sizing, crushing strength of the minus 7- plus 8-mesh size granules was about 7 pounds.

Chemical analyses showed that the KCl granular product contained 57.1 percent $K_2O$ equivalent and 0.2 percent moisture.

In carrying out the aforementioned test, there were no unusual problems encountered in the processing, handling, or transport of materials.

Typical operating data for this test are presented as Example VII in Table II, supra.

EXAMPLE VIII

Negative Test

Drum Granulator

In this KCl granulation test only marginal results were obtained with use of the rotary drum-granulation device and a KCl feedstock consisting of a mixture of pulverized and unpulverized Dumas dust. The Tyler particle screen-size distribution of the KCl feedstock was the same as that used for Example VI, supra; 55.0 percent plus 100-mesh size. 39.3 percent minus 100-plus 325-mesh size, and 5.7 percent minus 325-mesh size. The agglomerating solution was the same as that used for Example VII, supra; i.e., a 56.5 percent KCl-saturated water and 43.5 percent of 48 percent solution of ammonium lignosulfonate. The agglomerating solution was sprayed onto the active granulation bed in proportion for about 650 pounds/ton of product.

Granulation of feedstock and recycle material at the rotary drum-granulator unit was only marginal in that fines from the screening operation did not readily agglomerate and as a result, the particle-size distribution of the final product decreased as time of operation continued. Tyler particle screen-size distribution of the granulator discharge was 58.6 percent minus 6- plus 16-mesh size, 6.3 percent plug 6-mesh size, and 35.1 percent minus 16-mesh size. Crushing strength of the minus 7- plus 8-mesh size granules discharging from the granulator was 2pounds, and moisture content was 4.5 percent.

The granulator product was transported to the dryer by the same means as described in Example VII, supra, and after passing through the dryer, the product discharged at a temperature of about 250° F. Moisture content of the dryer product was 0.2 percent, and granule crushing strength of the minus 7-plus 8-mesh size granules was about 7 pounds. Tyler particle screen-size distribution of the dryer product was about 66.4 percent minus 6- plus 16-mesh size, about 10.1 percent plus 6-mesh size, and 23.5 percent minus 16-mesh size.

Chemical analysis showed that the granular KCl product contained 56.6 percent $D_2O$ equivalent and 0.2 percent moisture.

In carrying out the aforementioned test, granulation was judged to be not completely satisfactory in that fines consisting chiefly of particles in the Tyler screen-size range of about 12- minus 20-mesh size did not readily agglomerate in the granulator and, consequently, the overall particle-size distribution of the product decreased as time of the test run increased.

SUMMARY OF TEST RESULTS

Results of tests presented as examples, supra, show that fine-size $K_2SO_4$ or KCl can be economically granulated with use of a relatively small proportion of lignosulfonate-potassium salt solution in conventional pan- or rotary drum-type granulator devices. Particle-size distribution of feedstock dictates the choice of granulation device.

A pan-type granulator is very satisfactory for granulating $K_2SO_4$ of a preferred particle-size distribution of which no more than 25 to 30 percent is retained on the 100-mesh Tyler Standard Screen, 35 to 45 percent in the size range of minus 100- plus 325-mesh, and 25 to 35 percent should be less than 325-mesh size. With feedstock of this particle-size distribution, the pan-granulation operation is continuous, and all fines and crushed oversize are continuously returned to the granulator. However, $K_2SO_4$ feedstock that was satisfactory for pan granulation was not satisfacory as feedstock for rotary drum granulation because granulation could not be controlled. The difficulty was overgranulation or undergranulation. However, $K_2SO_4$ with a particle-size distribution of such that 55 to 65 percent is retained on a 100-mesh Tyler Standard Screen, 15 to 30 percent in the size range of minus 100- plus 325-mesh, and 15 to 25 percent should be less than 325-mesh screen. This size distribution has been determined to be very satisfactory for rotary-drum granulation but is not satisfactory for pan granulation in that the proportion of fines (−16 mesh) continued to increase with time and all crushed material and fines could not be returned to the granulator.

Both the pan- and rotary drum-type granulator devices were satisfactory for granulating KCl feedstock of preferred particle-size distribution of which no more than 30 to 40 percent is retained on the 100-mesh Tyler Standard Screen, 55 to 65 percent in the size range of minus 100- plus 325-mesh, and 5 to 10 percent less than 325-mesh size. Material of large particle-size distribution was not satisfactory as feedstock for pan or drum granulation. With larger particle feedstock, the quantity of minus 16-mesh material increases with time of operation and all of that produced cannot be returned to the granulation operation. This problem is aggravated by the observation that such material cannot be utilized as recycle since the fines proportion thereof increases to the point where there simply are so many discrete fine particles that the instant new agglomerating solution, even with the optimum amounts of lignosulfonate and potassium salt solutes, simply cannot bind these fine particles in a manner to provide the necessary agglomerating action.

INVENTION PARAMETERS

After sifting and winnowing through the data herein presented, as well as other results and operations of the new energy-efficient process for granulating $K_2SO_4$ or KCl from fine-size potassium salts which product granules are eminently suitable for blending with other popular blend materials in the bulk-blending segment of the fertilizer industry, the operation variables and preferred conditions for carrying out the process are summarized infra.

| Variables | Pan Granulator | | Drum Granulator | |
|---|---|---|---|---|
| | Limits | Preferred | Limits | Preferred |
| Operating Conditions for Granulating Potassium Sulfate | | | | |
| Particle-size (Tyler) distribution of feedstock, wt percent | | | | |
| +100 | 20–35 | 25–30 | 50–70 | 55–65 |

-continued

| Variables | Pan Granulator Limits | Pan Granulator Preferred | Drum Granulator Limits | Drum Granulator Preferred |
|---|---|---|---|---|
| −100 +325 | 30-50 | 35-45 | 10-40 | 15-30 |
| −325 | 20-55 | 25-35 | 10-30 | 15-25 |
| Agglomerating solution[a] | | | | |
| Formulation, total wt percent | | | | |
| Water, wt percent | 40-60 | 45-55 | 40-60 | 45-55 |
| $K_2SO_4$, wt percent | 3-20 | 3-11 | 3-20 | 30 11 |
| Lignosulfonate,[b] wt percent | 30-60 | 45-55 | 30-60 | 45-55 |
| Pounds feet/ton product | 425-675 | 500-600 | 500-900 | 650-750 |
| Dryer conditions | | | | |
| Product temperature, °F. | 220-280 | 240-260 | 220-280 | 240-260 |
| Moisture content, wt percent | 0.1-1.0 | 0.1-0.3 | 0.1-1.0 | 0.1-0.3 |

[a]In plant-scale operation, granulator scrubber liquor containing dissolved $K_2SO_4$ could be used in makeup of agglomerating solution. In bench-scale tests, the agglomerating solution contained from about 3 percent to about 15 percent, and usually about 9 percent by weight of dissolved $K_2SO_4$.
[b]Ammonium lignosulfonate (48% solution) or calcium lignosulfonate (58% solution)

Operating Conditions for Granulating Potassium Chloride

| | | | | |
|---|---|---|---|---|
| Particle-size (Tyler) distribution of feedstock, wt percent | | | | |
| +100 | 25-45 | 30-40 | 25-45 | 30-40 |
| −100 +325 | 40-70 | 55-65 | 40-70 | 50-65 |
| −325 | 3-15 | 5-10 | 3-15 | 5-10 |
| Agglomerating solution[a] | | | | |
| Formulation, total wt percent | | | | |
| Water, wt percent | 40-60 | 45-55 | 40-60 | 45-55 |
| KCl wt percent | 3-50 | 3-30 | 3-50 | 3-30 |
| Lignosulfonate,[b] wt percent | 30-60 | 45-55 | 30-60 | 45-55 |
| Pounds feet/ton product | 350-700 | 400-500 | 500-800 | 600-700 |
| Dryer conditions | | | | |
| Product temperature, °F. | 220-280 | 240-260 | 220-280 | 240-260 |
| Moisture content, wt percent | 0.1-1.0 | 0.1-0.3 | 0.1-1.0 | 0.1-0.3 |

[a]In plant-scale operation, granulator scrubber liquor containing dissolved KCl could be used in makeup of agglomerating solution. In bench-scale tests, the agglomerating solution contained from about 15 percent to about 30 percent by weight of dissolved KCl
[b]Ammonium lignosulfonate (48% solution) or calcium lignosulfonate (58% solution).

While we have shown and described particular embodiments of our invention, modifications and variations therfeof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for the production of granular potassium chloride, which process comprises the steps of:

(a) maintaining in a horizontally-inclined rotary pin a bed of fines recycled from a later-mentioned sizing step in continuous and alternating rising and cascading motion;

(b) introducing a stream of an aqueous solution comprising potassium chloride, and metal or ammonium salts of lignosulfonic acid onto the upper active area of the cascading portion of said bed of fines; said aqueous solution containing from about 14 to about 35 weight percent of said salt of lignosulfonic acid and from about 3 to about 30 percent by weight of said dissolved potassium chloride;

(c) introducing a stream of substantially dry finely-divided particulate material comprising potassium chloride of a Tyler Screen size fraction distribution wherein about 25 to about 45 percent is retained on a 100- mesh screen, about 45 to about 70 percent is retained on a 325-mesh screen, and about 3 to about 15 percent is minus 325-mesh screen onto the upper active area of the cascading portion of said bed of fines juxtaposed said solution introduced in step (b), supra, the proportion of said stream of solution, to the proportion of said stream of substantially dry particulate material, being predisposed to effect in the material discharged from said rotary pin in step (f), infra, a moisture content ranging from about 2 to about 8 percent by weight;

(d) maintaining the temperature of said bed of fines in said horizontally-inclined rotary pan at about ambient temperature;

(e) maintaining the particulate material introduced into said horizontally-inclined rotary pan for a time sufficient to effect therein agglomeration of granules of said potassium chloride of size sufficient to range from between about 60 to about 90 percent minus 6 plus 16-mesh Tyler Standard Screen Scale series;

(f) discharging continuously over the lower rim of said horizontally-inclined rotary pan the resulting granular potassium chloride;

(g) introducing the resulting discharged granular material resulting from step (f), supra, into dryer means to effect reduction of the water content thereof;

(h) maintaining the material introduced into said dryer means at a temperature in the range from about 220° F. to about 280° F. and for a time sufficient to effect a reduction in the moisture content thereof from about 2 to about 8 percent down to the range of about 0.1 to about 0.4 percent by weight;

(i) removing at least a portion of the resulting dried granular material from said dryer means and introducing same into cooling means to effect a reduction in the temperature thereof by contacting said resulting dried granular material with a counter current flow of air at about ambient temperature for a time sufficient to effect a reduction of the temperature of said granular material therein down to the range of about 100° F. to about 150° F.; and (j) subsequently removing the resulting cooled granular material from said cooling means in step (i), supra, and introducing same into sizing means to therein effect sizing of said material, returning the undersize or crushed oversize to the upper rim of said horizontally-inclined rotary pan and withdrawing the size fraction minus 6 plus 16 mesh Tyler Standard Screen Scale series as onsize material product.

2. A process for the production of a granular potassium chloride, which process comprises the steps of:

(a) maintaining in an inclined rotating rotary drum-type granulator a rolling bed of particles comprising potassium chloride;

(b) continuously introducing into the upper end of said inclined rotating drum a stream of recycle material and substantially dry particulate material, said recycle material comprising fines and crushed oversize product recycled thereto from a later-mentioned sizing step and said stream of particulate material comprising potassium chloride of a particle size distribution wherein about 25 to about 45 percent is retained on a 100-mesh screen, about 40 to about 70 percent is retained on a 325-mesh screen and about 3 to about 15 percent is −325 mesh screen;

(c) continuously introducing into said inclined rotating drum a stream of aqueous solution above or below the surface of said rolling bed, said stream of solution comprising potassium chloride, and metal or ammonium salts of lignosulfonic acid; said aqueous solution containing from about 14 to about 35 weight percent of said salt of lignosulfonic acid and from about 3 to about 30 percent by weight of said dissolved potassium chloride, the relative proportion of said stream of solution introduced into said rotating drum granulator to the proportion of said stream of particulate material and said recycle introduced in step (b), supra, being maintained so as to effect in the material discharged from said granulator in step (f), infra, a moisture content ranging from about 2 to about 8 percent by weight;

(d) admixing said particulate material and said recycle material with said solution for a time sufficient so as to effect agglomeration by both the wetting action of said solution and rolling action imparted by the rotating drum to said mixture of dry particulate material and recycle material;

(e) maintaining the materials introduced into said inclined rotating drum at about ambient temperature and for a time sufficient to effect therein agglomeration of granules of potassium chloride of size sufficient to range from between about 60 percent to about 90 percent minus 6- plus 16-mesh Tyler Standard Screen Scale;

(f) continuously discharging at least a portion of the granular material resulting from step (e), supra, from the lower end of said inclined rotating drum and introducing same into dryer means to effect reduction of the water content thereof;

(g) maintaining the material introduced into said dryer means at a temperature in the range from about 220° F. to about 280° F. and for a time sufficient to reduce the moisture content of said potassium chloride from about 2 to about 8 percent down to the range from 0.1 to about 0.4 percent by weight, and subsequently introducing the resulting dried granular material into cooling means;

(h) contacting the resulting dried granular material in said cooling means with a counter current flow of air at about ambient temperature for a period of time sufficient to effect reduction of the temperature of the potassium chloride discharged from said dryer means and introduced thereinto down to a temperature in the range from about 100° F. to about 150° F.; and (i) subsequently removing the resulting cooled material from said cooling means in step (h), supra, and introducing same into sizing means wherefrom product granules ranging from about minus 6 to about plus 16-mesh Tyler Standard Screen Scale are recovered and withdrawn to storage and wherefrom undersize and crushed oversize are recycled to said feed end of said inclined rotating drum.

* * * * *